May 28, 1940. F. L. O. WADSWORTH 2,202,409
APPARATUS FOR SHEARING MOLTEN GLASS
Original Filed Jan. 18, 1935 2 Sheets-Sheet 1
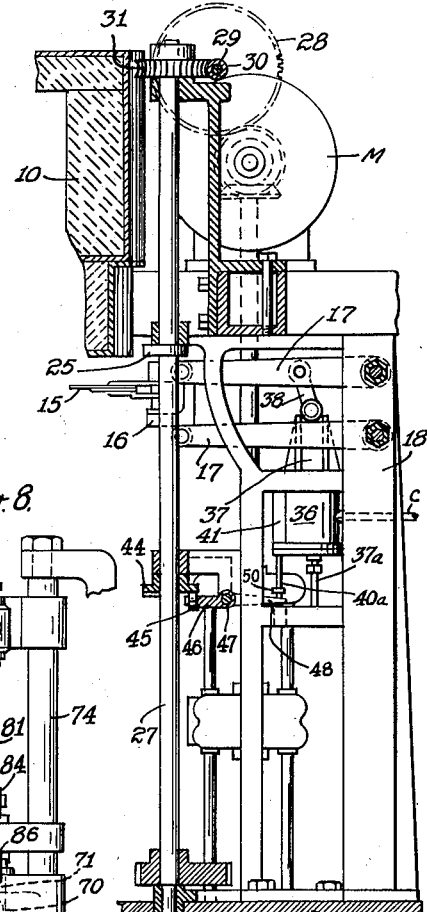
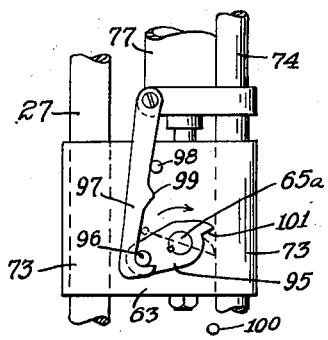
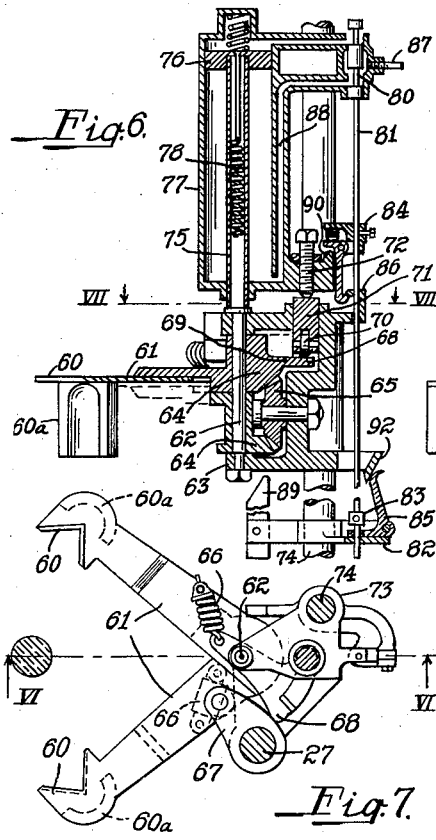
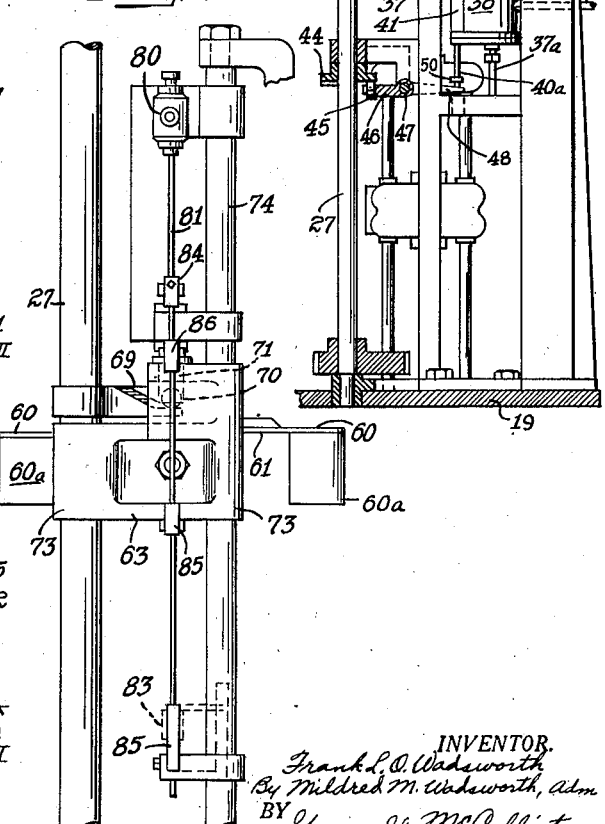
INVENTOR.
Frank L. O. Wadsworth
By Mildred M. Wadsworth, Adm.
BY Green & McCallister
Her ATTORNEYS.

May 28, 1940.　　F. L. O. WADSWORTH　　2,202,409
APPARATUS FOR SHEARING MOLTEN GLASS
Original Filed Jan. 18, 1935　　2 Sheets-Sheet 2
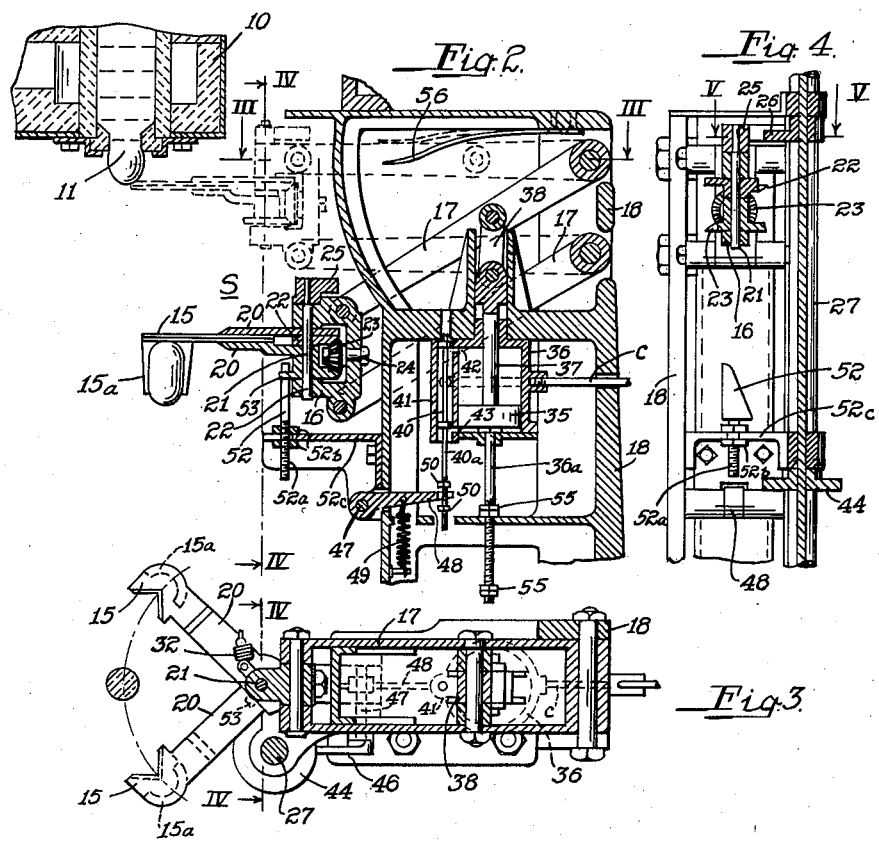
INVENTOR.
Frank L. O. Wadsworth
By Mildred M. Wadsworth, Adm.
BY Green & McCallister
Her ATTORNEYS.

Patented May 28, 1940

2,202,409

UNITED STATES PATENT OFFICE 2,202,409

APPARATUS FOR SHEARING MOLTEN GLASS

Frank L. O. Wadsworth, deceased, late of Pittsburgh, Pa., by Mildred M. Wadsworth, administratrix, Pittsburgh, Pa., assignor to Ball Brothers Company, Muncie, Ind., a corporation of Indiana Original application January 18, 1935, Serial No. 2,361. Divided and this application June 1, 1937, Serial No. 145,667

6 Claims. (Cl. 49—14)

This invention relates to glassware forming machines of the press and blow type and more particularly to an improved apparatus for and method of severing a continuously flowing stream of molten glass into individual mold charges and for delivering such severed charges to the molds of the forming machine, and is a division of a pending application Serial No. 2,361, filed January 18, 1935, by Frank L. O. Wadsworth, deceased.

The principal object of this invention is to provide a new and improved means for severing a continuously flowing mass of molten glass into individual mold charges and for delivering each formed mold charge to an individual mold of one or more series of molds while such molds are moving and for projecting such charges at a high velocity along a predetermined path which terminates in such moving mold.

A further object of this invention is to provide a shear mechanism which not only severs a continuously flowing stream and projects each such severed mold charge downwardly at a high velocity but in which the mechanism is so arranged as to move the mold charges laterally as well as downwardly so that at the instant of entering the mold, a component of the projected motion of each charge is substantially in line with the direction in which the mold is traveling. The improved shear mechanism is so arranged that at the moment of severing a charge from the molten stream it lightly embraces the severed charge and it is then moved downwardly at a speed materially in excess of that of the flowing stream and also substantially in excess of that of a freely falling body and the severed charge is thereby delivered to the receiving receptacle at a velocity which is much greater than it would acquire under the action of gravity alone and during this accelerated downward movement the charge embracing shear elements are preferably moved laterally in the direction in which the receiving receptacle is traveling and the rate of lateral displacement of the directed charge is preferably substantially equal to the circumferential speed of mold movement at the time when the charge enters the mold.

These and other objects which will hereinafter be made readily apparent to those skilled in this particular art are accomplished by means of the invention described in the following specification and illustrated in the accompanying drawings, wherein:

Figure 1 is an elevation partly in section illustrating the improved shear mechanism in connection with the forming machine and illustrates its relation to the forehearth of a glass feeding device;

Fig. 2 is a section elevation of the shear mechanism shown in Fig. 1, taken through the center of the flow orifice in the forehearth;

Fig. 3 is a horizonal section on the plane III—III of Fig. 2;

Fig. 4 is a sectional elevation on the planes IV—IV of Figs. 2 and 3;

Fig. 5 is a horizontal section on a greatly enlarged scale on the plane V—V of Fig. 4;

Fig. 6 is a sectional elevation of another form of shear and accelerated delivery mechanism which embodies certain features of the present improvements;

Fig. 7 is a sectional plan view of the plane VII—VII of Fig. 6;

Fig. 8 is a rear elevation of the mechanism shown in Figs. 6 and 7; and

Fig. 9 is a partial rear view of another modification of the mechanism shown in Figs. 6 to 8, inclusive.

Referring to the drawings in detail, 10 represents a forehearth, feeder boot or container for molten glass which is attached to the front end of a glass melting furnace or tank and from which the molten glass is being fed by any suitable mechanism (none shown) in a continuously flowing but pulsating stream through an orifice 11 in the bottom of the forehearth 10.

The stream of glass flowing continuously through the orifice 11 is severed into mold charges by the improved shear mechanism S which is equipped with quick acting shears and is so arranged that immediately subsequent to such severance the shear is not only moved downwardly at a speed greater than the glass flow within the stream but also at a speed greater than the velocity of drop under the action of gravity, and in addition to this is further moved laterally so that each mold charge severed by the shear mechanism S is projected at a high velocity in a downwardly inclined direction with the lateral component of its motion substantially in the same direction as that in which the mold adapted to receive the charge is traveling at the time of reception. The shear mechanism S is equipped with a pair of quick acting shear blades 15—15, preferably of the "cat's-eye" type and so located that they sever the stream issuing from the orifice 11 immediately below that orifice. The blades 15—15 are mounted on a swinging U-shaped head 16, which in turn is supported by parallel links 17—17, pivotally secured to a suitable bracket 18, projecting upwardly from the bottom plate 19 of the forming machine frame, and also pivotally secured to the head 16. Each shear blade 15—15 is secured to an arm 20 which is rotatably supported on shaft 21 that is journaled in the arms or prongs of the U-shaped head 16; and each arm 20 is provided with a gear sector 22 which meshes with an intermediate bevel gear 23 journaled on a suitable stub shaft 24 carried by the head 16. One of the arms 20 is keyed to the shaft 21, and this shaft is also provided with a shear closing cam finger 25 rigidly secured thereto.

The head 16 is adapted to swing from the position shown in dotted lines in Fig. 2 to the position shown in full lines in that figure, while and after the shears are being moved from their uppermost open position shown in Figs. 1 and 3 (and in dotted lines in Fig. 2) to the full line position of Fig. 2; and the cam finger 25 is so located on the shaft 21 that when the head 16 and the associated parts are located in the uppermost position (dotted line position), the finger is adapted to be engaged by a cam 26 mounted on the vertical drive shaft 27 (Figs. 1 and 5), the lower end of which is journaled in the plate 19 and which is driven from the motor M through the gear, shaft, worm and worm gear elements 28, 29, 30 and 31. The cam 25 is so formed, and the relationship between it and the finger 26 is such, as to gradually accelerate the closing movement of the shear blades 15—15 and to complete the closing movement or the severance of the flowing stream while the blades are moving at their maximum closing velocity. In order to facilitate the relative movements of the cooperating elements during the final acceleration period of stream severance, the outer end of the cam lobe 26 may be provided with a cam roller 26a.

The angular position of the cam 25 on the shaft 27 is so adjusted that the shears are closed in proper timed relation with the feeder mechanism (not shown) so that the severance of the stream is accomplished at sections of the stream of minimum cross-sectional area. The final closing of the shears is accomplished or accelerated by a snap spring 32—32, hereinafter more fully described.

In order to prevent any checking of the flow through the orifice 11 at the time of severance, the blades are adapted to move downwardly not only after the severance is completed, but also during their passage into and through the stream of flowing glass; and at this time they preferably move downwardly at a speed which is at least equal to that of this stream, but which is less than the accelerated speed of the shear blade closing movement. This downward movement is effected by connecting the parallel links 17—17 to a pneumatically operated piston 35 which is mounted in a cylinder 36 that is carried by the machine frame. The piston 35 is operatively connected to the links 17—17 by means of the piston rod 37 and the links 38.

The delivery of actuating fluid to the cylinder 36 is controlled by a double piston valve 40 which is so arranged, with relation to its casing 41 and the ports 42—43 formed therein, that when the valve is in its uppermost position—as shown in Fig. 2—fluid under pressure is admitted to the cylinder above the piston 35 and the portion of the cylinder below the piston is open to the atmosphere. An inspection of the illustration forming a part of Fig. 2 will also disclose that when the valve 40 is in its lowermost position, fluid under pressure is admitted to the cylinder below the piston 35, whereas the portion of the cylinder above the piston is then open to the atmosphere. By this arrangement, reciprocations of the valve 40 control the reciprocation of the piston 35 and thus control and time the swing of the shear carrying head 16. Air under pressure is preferably employed as the motive fluid delivered to the cylinder 36 and is received by the casing 41 of the valve 40 through a pipe C and associated passages and ports.

The valve 40 is actuated by means of face cam 44 mounted on the shaft 27 (Fig. 1) and a cooperating cam lever assembly, which comprises a cam roller 45 carried by an arm 46, a cross shaft 47 to which the arm 46 is secured, and a second arm 48 which is keyed to the shaft 47 and is provided with a bifurcated end which embraces a downwardly projecting portion of the stem 40a of the valve 40, and a coil spring 49 which acts on the arm 48 and yieldingly presses the roller 45 against that surface of the face cam 44. The cam controlled movement of the lever assembly 46—48, etc., is imparted to the valve 40 by means of a lost-motion connection which, as illustrated, is provided by threading nuts 50—50 onto the stem 40a so that they are located on opposite sides of the bifurcated end of the arm 48. With this arrangement, the extent of the lost motion may be adjusted, and the time of operation of the piston 35 may be varied slightly by adjusting the position of one or both the nuts 50, and without changing the adjustment or the positioning of the cam 44 on the shaft 27.

From the foregoing it will be apparent that the downward movement of the shears may be, and preferably is, initiated prior to the time that the severance of the stream, by the blades 15 is completed, and that the shears then continue their downward movement after the blades have completed their cutting movement at a greatly accelerated velocity. In order to maintain control of the severed mold charge, the shear blades 15 are provided with downwardly projecting semi-cylindrical guard sleeves 15a—15a, each of which is so located on its supporting blade that when the blades are in the closed position the two guards cooperate to form an open bottom cylindrical receptacle which envelops the severed charge as illustrated in Fig. 2.

When the shear head 16 arrives at its lowermost position, the shear blades 15—15 are opened, and the severed mold charge is thus released from its engagement with the sleeve guards 15a—15a, and continues its downward movement along the direction imposed on it by the downwardly swinging blades. In other words, the charge is projected along a line tangent to the end of the arcuate downward movement of the shear blades, and consequently the blades together with their carrying guards 15a—15a, are preferably opened, or at least partially opened, prior to the completion of the downward swing of the shear head 16. This opening of the blades 15—15 is accomplished by a stationary wedge-shaped blade or cam 52 which is adjustably mounted on the machine frame, as shown in Figs. 2 and 4, and is so located that its inclined face engages a finger 53, carried by the lower shear arm 20. The snap springs 32—32 first resist and then complete the opening of the shears.

As illustrated the springs 32—32 (Fig. 3) are coiled compression springs pivotally secured to the arms 20—20 and also to the head 16, and are so positioned with relation to the arms 20—20 and head that they function to resist both the closing and the opening movement of the shear blades until its points of pivotal connection with the arms 20—20 and the head 16 have passed the "dead center" line, whereupon the springs function not only to accelerate the closing and opening movements, but also to hold the shear blades fully opened or fully closed.

The movement of the shear head piston 35 may be limited and adjusted by means of stop nuts 55—55 located on a downwardly projecting extension 37a of the piston rod 37, which projects through a suitable aperture formed in a bracket of the machine frame. The upward movement of the shear head 16 may also be cushioned by a spring 56 carried by the machine frame and arranged to engage at least one of the links 17 as the shear head moves upwardly.

It will be noted that the shear opening blade or cam 52 is provided with a screw threaded shank 52a, and is held in place by clamping nuts 52b—52b which engage either side of a suitable bracket 52c secured to the machine frame; and that therefore the time of shear opening, with relation to the downward swing of the shears, may be adjusted throughout a relatively wide range, and that this adjustment may be accomplished while the shear mechanism is in operation.

The operation of the shear mechanism is as follows: As the shear head 16 swings upwardly, the blades 15 are open, therefore, their upward movement does not in any way interfere with the charge forming operation which is taking place below the orifice 11. After the issuing stream of molten glass is swelled by the feeder mechanism, the cam 26 comes into engagement with the finger 25 and initiates the shear closing movement which is completed by the combined action of the cam and finger and the double acting snap spring 32. During the shear closing operation, and just before the shear blades are in actual cutting engagement with the depending stream of glass issuing from the orifice 11, the downward movement of the head 16 is initiated by the cam actuated valve 40, which is shifted to the position shown in Fig. 2, thus admitting compressed air to the top of the cylinder 36 and causing the piston 35 to move downward. In this way the shear cut is completed while the blades are moving axially with the flowing stream—thus preventing any "piling up" of the molten material therein—and the downward motion is continued, at a rapidly accelerated rate after a mold charge is severed and is ready for delivery to a press or parison mold.

As already explained, the movement of the shear head assembly is a combined downward and lateral travel, or in other words, is an arcuate movement defined and controlled by the parallel linkage 17—17, during which the moving parts—including the severed mold charge—all travel in parallel relationship. As the head 16 nears the end of its downward swing, the finger 53 engages the stationary blade cam 52, thus opening the shear blades 15 as the head completes its downward movement. It should be understood that the snap spring 32 is preferably so arranged that it will complete this opening movement, although the positioning and adjustment of the cam blade 52 may be such that the cam in and of itself will complete the shear opening operation.

As the head 16 reaches the lower end of its swing, the face cam 44, acting through the lever assembly 46—48, etc., shifts the position of the valve 40 to admit motive fluid below the piston 35, thus causing it to move the head 16 upwardly until it is stopped by the spring 56, and such piston throw limiting means as may be provided for the piston 35. Air under pressure is maintained in the portion of the cylinder 36 below the piston until the valve 40 is again actuated by the cam 44 and the associated mechanism; but in the meantime, the cam 25 again acts to initiate the closing movement of the shear blades and the cycle of operation is then repeated.

Figs. 6, 7, 8 and 9 illustrate certain alternative forms of shear mechanism which may be used in place of the one shown in Figs. 1-5, inclusive. The construction now under consideration presents a number of features (e. g., a pair of cat's eye shear blades 60—60 with their attached semi-cylindrical cup guards 60a-60a; a corresponding pair of shear blade supporting arms 61—61 pivotally mounted on a shaft 62 in a U-shaped head 63, and interconnected by bevel gear sectors 64—64 and a bevel pinion 65; and double acting snap springs 66—66 for alternately resisting and assisting the closing and opening of the shear blades) which are substantially identical with the corresponding parts of the first described construction, and which do not therefore require further attention. The shear blade elements of this second exemplary severing mechanism are closed by the action of a revolving dog 67, which is secured to the shaft 27; and which is adapted to engage with a cam 68 that forms a part of the upper shear blade arm; the general character and mode of action of these engaging elements being the same as is shown in the enlarged view of Fig. 5 (supra). But in this case the member 68 is further provided, on its upper side, with a wedge shaped face cam 69, that is adapted to engage with a roller 70 at the lower end of a short stud 71, which is slidably mounted in the U-shaped shear head 63, and is engaged in turn by an adjustable stop screw 72 carried by an adjacent portion of the machine frame. With this arrangement the closing of the shear blades by the action of the revolving dog automatically moves the shear head downwardly, (by the reaction between the wedge cam 69 and the stationary roller 70); and by properly shaping the face of the cam 69 one can obtain any desired ratio between the concurrent transverse and axial movements of the cutting elements—relative to the glass stream—during the severing operation.

The shear head 63 is provided with laterally extending bosses 73—73 which slidably engage with the vertical drive shaft 27 and with an associated stationary guide rod 74, that is carried by the machine frame. The journal pin 62, on which the shear blade arms are pivotally mounted, is rigidly secured in the shear head 63 and is extended upwardly to engage with the lower portion of a hollow piston rod 75, which is connected, at its upper end, to a piston 76, that slides in a fixed cylinder 77 carried by the guide rod 74. When this piston is at the top of its stroke, the shear head 63 is held in its raised position (with the stud 71 in abutting engagement with the stop screw 72) by a tension spring 78 which elastically connects the piston and journal pin elements 76 and 62. The admission of motive fluid to the opposite ends of the cylinder 77, for the purpose of moving the elastically connected members 76 and 62 up and down, is controlled by a triple piston valve 80, whose stem 81 is extended downwardly through a guide block 82 adjustably secured on the guide rod 74, and is provided with adjustable collars 83 and 84, that cooperate with the tappet elements 85 and 86, in effecting the shifting or reversal of the control 80. Motive fluid is supplied to the central chamber of the valve 80 through a pipe 87 which leads to any suitable source of supply.

The mode of operation of the above described form of severing mechanism is as follows: In the position shown, the motive fluid supply pipe 87 is in communication with the lower end of the cylinder 77 (through the passage 88) and all of the parts are held in their raised position ready for the severance of the glass stream. As the shaft 27 revolves the dog 67 is engaged, at the proper instant, with the shear arm cam 68 and acts to close the shear blades, this closing movement effecting, as already explained, a concurrent downward movement of the cutting elements, which is controlled, in amount, by the contour of the face cam 69, and which is permitted by the stretching of the spring 78. As the head 63 moves downward the tappet 86 engages the end of a pivoted dog on the valve stem collar 84 and pulls the valve 80 downward, thus cutting off communication between the supply pipe 87 and the bottom of the cylinder 77, opening the latter to the atmosphere and concurrently admitting motive fluid to the upper end of the cylinder. The resultant downward movement of the piston 76 immediately re-engages the end of the piston rod 75 with the shear frame head 63 and carries the latter with it at a progressively accelerated velocity which is of course communicated to the severed charge by the closed shear blade and attached cup guard elements. In this downward movement the dog on the valve stem collar 84 is disengaged from the shear head tappet 86, by the engagement of a lateral projection on the dog with an adjacent lug 90 on the cylinder frame 77, and the balanced piston valve 80 is thus left in its lowered position until the piston 76 and the shear head 63 approach the lower end of their stroke. At this point in the operation, a wedge-shaped cam finger 89, which is attached to the adjustable guide block 82, engages with a lateral projection on one of the shear blade arms, and cooperates with the double action snap spring in opening these arms in the manner previously described. Concurrently with this action a beveled projection 92 on the head 63 makes contact with the upper end of the tappet lever 85, and rocks this lever in a clockwise direction on its pivot support to engage and lift the valve stem collar 83, thereby restoring the valve 80 to its initial position, in which the lower end of the cylinder 77 is in communication with the fluid supply pipe 87 and the upper end is open to the atmosphere. The piston 76 is then immediately returned to the upper end of its stroke, carrying with it the shear head 63 and its associated parts. This completes the cycle of one severing operation.

In the construction last described no means are provided for imparting a lateral or transverse component of motion to the shear head during its downward movement; but the cross sectional area of the cylinder 77 is designedly such that the accelerated velocity imparted to the severed charge—by the action of the motive fluid on the piston 76—is so great that it will be projected into the press mold before the relatively slow lateral movement of the latter can interfere with its proper reception. In order to attain this result the shear closing dog 67 must of course be so adjusted on the shaft 27 that the charge is severed just before the subjacent mold adapted to receive the charge is brought into vertical alignment with the axis of the cylinder 77; this adjustment varying of course with the peripheral (circumferential) speed of travel of the receiving receptacles, and their vertical distance below the plane of severance.

In Fig. 9 a slight modification is shown of one portion of the construction illustrated in Figs. 6, 7 and 8. In this modification the bevel gear pinion 65 which connects the bevel gear sectors 63—64 of the two shear blade arms, is keyed to its supporting shaft 65a and the outer end thereof is provided with a crank arm 95 which carries a pin 96 that is adapted to be engaged by the hooked extremity of a lever 97, when the shearhead 63 is in its raised position. The lever 97 is pivotally mounted on the frame of the cylinder 77 and when the head 63 is moved downward the engagement of the hooked lever 97 with the crank pin 96 will rotate the shaft 65a and its connected bevel pinion and will thereby close the shear blades. As soon as this has been effected the parts 96 and 97 are disconnected by the engagement of a stud pin 98 on the downwardly moving head, with a projection 99 on the lever 97. At the end of the downward movement of the shear frame, the shear blades are opened by the engagement of a fixed pin 100 with a projecting tooth 101 on the crank arm 95.

In operating the modified construction last described the initial downward movement of the shear head 63 may be produced and controlled by the action of a suitably contoured face cam on the shaft 27 (which takes the place of the edge cam tooth 67) and the following accelerated delivery and return movements effected by the pneumatically actuated mechanism shown in Figs. 6, 7 and 8. When operated in this way the only material difference between the two constructions shown in Figs. 6 and 9 is that in the first the mechanical closing of the shear blades (by the cam on the shaft 27) is the cause of the concurrent axial movement of the shear head; whereas in the second, the initial cam actuated downward movement of this head effects the closing of the cutting elements; a reversal of cause and effect.

While certain exemplifications of the invention have been described, it is to be understood that certain changes, modifications, substitutions and omissions may be made therein without departing from the spirit of the invention or the scope of the appended claims.

It will be understood that there have been devised several other structures and procedures for severing a continuously flowing stream of molten glass and in which the shear blades move downwardly with the stream during the severance and that such structures and procedures not only structurally and functionally distinguish from the subject matter herein claimed, but also form the subject matter of and are claimed in the following Letters Patent Nos. 2,166,563 of July 18, 1939, 2,164,184 of June 27, 1939, 2,143,096 of January 10, 1939, 2,108,518 of February 15, 1938, 2,100,760 of November 30, 1937, 2,092,865 of September 14, 1937, 2,092,864 of September 14, 1937, 2,090,082 of August 17, 1937, and 2,062,623 of December 1, 1926.

What is claimed as new and desired to be secured by Letters Patent is:

1. A shear mechanism for a glass feeder comprising coacting shear blades, a movable head on which said blades are mounted, means carried by said head for actuating said blades, means for reciprocating said head, cam fingers carried by said shear actuating means, a cam positioned to engage one of said fingers while said head is in one position, and a second cam positioned to engage the other of said fingers as said head is moving to another position.

2. In a glass fabricating apparatus, a shear mechanism comprising a head, shear blades carried by the head, means for reciprocating the head, means for initiating a closing movement of the blades, and means for accelerating that movement while said head is moving.

3. In a glass fabricating apparatus, a shear mechanism comprising a movable head, shear blades carried by the head, means for moving the head at a high velocity, means for initiating a closing movement of said blades, means for completing such movement while said head is moving, and means for opening said blades prior to the completion of the movement of the head.

4. In a glass fabricating apparatus, a shear mechanism comprising a movable head, shear blades carried by said head, means carried by such blades for loosely engaging a severed charge, means for closing the blades, means for moving the head downwardly during the closing movement of said blades, and means for opening the blades during the downward movement of the head.

5. In a glass fabricating apparatus, a shear mechanism comprising a head, a pair of shear blades carried by the head, means for closing said blades, means for moving said head along a line perpendicular to the closing movement of said blades, while said blades are closing and then along a curved line, and means for opening said blades.

6. A shear mechanism for severing successive charges of molten glass from a suspended stream, comprising a head, a pair of blades carried by said head, means for initiating a closing movement of said blades, means for moving said head parallel to the line of flow of said stream during the closing movement of said blades and for then moving said head along a curved line, and means for initiating the opening movement of said blades as said head is moving along said curved line.

MILDRED M. WADSWORTH,
*Administratrix of the estate of Frank L. O. Wadsworth, Deceased.*